(12) United States Patent
Karacali-Akyamac et al.

(10) Patent No.: US 11,784,944 B2
(45) Date of Patent: Oct. 10, 2023

(54) DYNAMIC BANDWIDTH ALLOCATION IN CLOUD NETWORK SWITCHES BASED ON TRAFFIC DEMAND PREDICTION

(71) Applicant: INTERNATIONAL BUSINESS MACHINES CORPORATION, Armonk, NY (US)

(72) Inventors: Bengi Karacali-Akyamac, Yorktown Heights, NY (US); Claude Basso, Nice (FR); Nicolas Dupuis, New York, NY (US); Thomas James Christopher Ward, Romsey (GB); MD Abdul Alim, Austin, TX (US); Pavlos Maniotis, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/647,717

(22) Filed: Jan. 11, 2022

(65) Prior Publication Data

US 2023/0224258 A1    Jul. 13, 2023

(51) Int. Cl.
*H04L 47/80* (2022.01)
*H04L 47/78* (2022.01)
*H04L 47/762* (2022.01)

(52) U.S. Cl.
CPC .......... *H04L 47/805* (2013.01); *H04L 47/762* (2013.01); *H04L 47/781* (2013.01); *H04L 47/801* (2013.01)

(58) Field of Classification Search
CPC ... H04L 47/805; H04L 47/762; H04L 47/781; H04L 47/801
See application file for complete search history.

(56) References Cited

U.S. PATENT DOCUMENTS

| | | | |
|---|---|---|---|
| 8,213,453 B1 * | 7/2012 | Voruganti | H04L 47/30 370/395.42 |
| 8,867,390 B2 | 10/2014 | Chen et al. | |
| 9,729,457 B2 | 8/2017 | Kalkunte et al. | |
| 10,148,492 B2 * | 12/2018 | Chawla | H04L 41/5077 |
| 10,178,011 B2 | 1/2019 | Kamath et al. | |
| 2010/0296474 A1 * | 11/2010 | Noriega | H04L 47/10 370/329 |
| 2012/0213114 A1 * | 8/2012 | Chen | H04L 1/0002 370/252 |
| 2014/0233389 A1 * | 8/2014 | Bantukul | H04L 41/147 370/236 |
| 2016/0353268 A1 * | 12/2016 | Senarath | H04L 47/805 |
| 2017/0230065 A1 * | 8/2017 | Saraswathyama | H04L 12/6418 |
| 2017/0230269 A1 * | 8/2017 | Kamath | H04L 41/0823 |
| 2018/0048537 A1 * | 2/2018 | Gaikwad | H04L 41/0896 |
| 2018/0309640 A1 | 10/2018 | Nagarajan et al. | |
| 2020/0366617 A1 * | 11/2020 | Kommula | H04L 47/20 |
| 2020/0382428 A1 * | 12/2020 | Kumar | H04L 47/2475 |

* cited by examiner

*Primary Examiner* — Glenton B Burgess
*Assistant Examiner* — Jihad K Boustany
(74) *Attorney, Agent, or Firm* — Griffiths & Seaton PLLC

(57) ABSTRACT

Embodiments for dynamic bandwidth allocation in cloud network switches in a cloud computing environment are provided. Quality of service (QoS) policies may be dynamically changed in one or more cloud network switches based on dynamically estimating expected traffic demands for each of a plurality of traffic classes, wherein bandwidth is dynamically allocated among queues based on changing the QoS policies.

18 Claims, 7 Drawing Sheets ically changed based on expected traffic demand for each of a plurality of traffic classes that map to queues on ports of network elements. Bandwidth allocation among queues of a given port in one or more cloud network switches may be dynamically changed by changing the QoS policies.

DYNAMIC BANDWIDTH ALLOCATION IN CLOUD NETWORK SWITCHES BASED ON TRAFFIC DEMAND PREDICTION

BACKGROUND OF THE INVENTION

Field of the Invention

The present invention relates in general to computing systems, and more particularly to, various embodiments for dynamic bandwidth allocation in cloud network switches in a cloud computing environment based on traffic demand predictions.

Description of the Related Art

A popular type of large-scale computing is cloud computing, in which resources may interact and/or be accessed via a communications system, such as a computer network. Resources may be software-rendered simulations and/or emulations of computing devices, storage devices, applications, and/or other computer-related devices and/or services running on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

SUMMARY OF THE INVENTION

Various embodiments are provided for dynamic bandwidth allocation in cloud network switches in a cloud computing environment. One or more quality of service (QoS) policies in one or more cloud network switches may be dynamically changed based on expected traffic demand for each of a plurality of traffic classes that map to queues on ports of network elements. Bandwidth allocation among queues of a given port in one or more cloud network switches may be dynamically changed by changing the QoS policies.

In addition to the foregoing exemplary method embodiment, other exemplary system and computer product embodiments are provided and supply related advantages.

BRIEF DESCRIPTION OF THE DRAWINGS

In order that the advantages of the invention be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
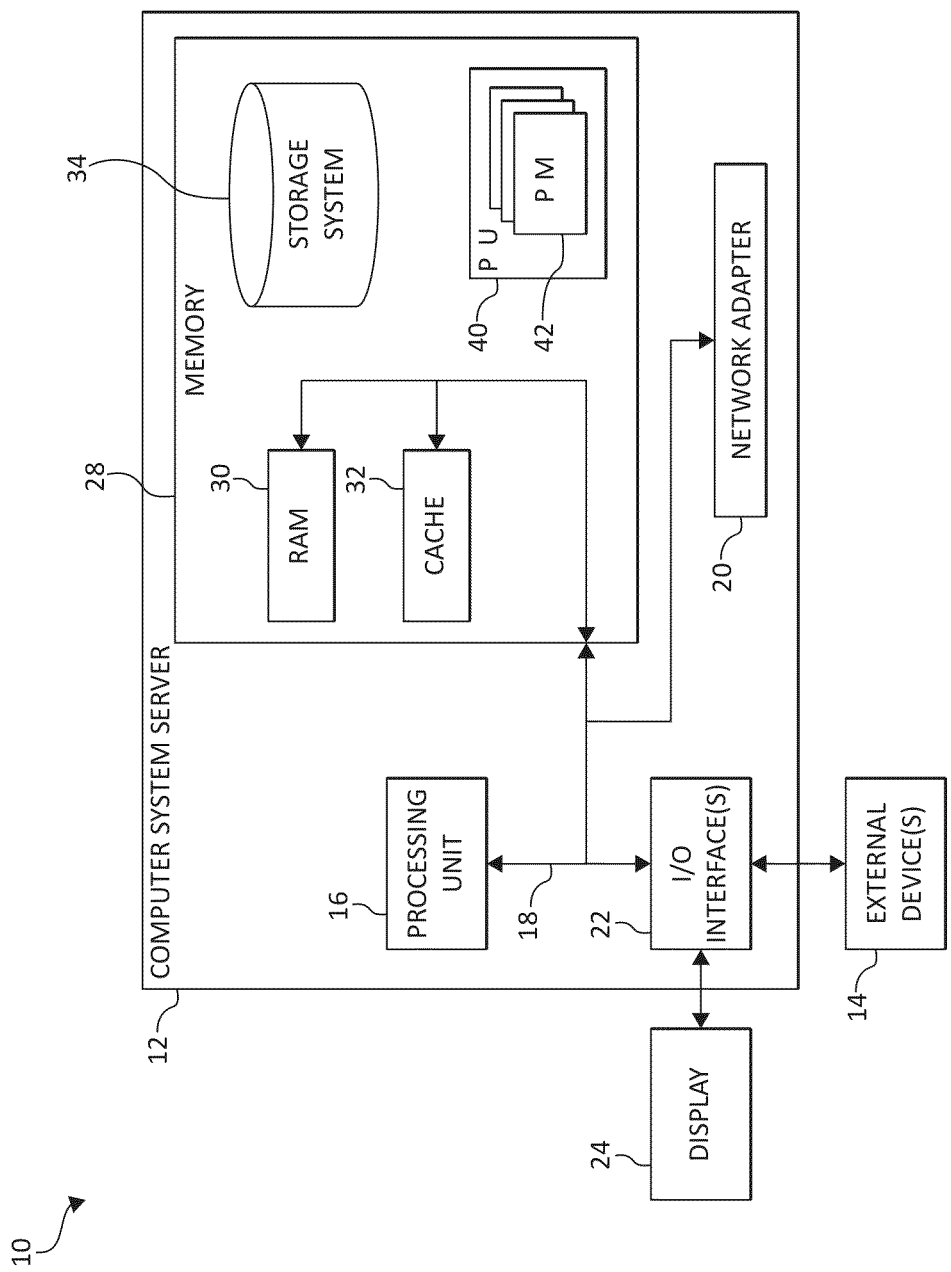
FIG. 1 is a block diagram depicting an exemplary computing node, according to embodiments of the present invention.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Cloud networks incur constant churn in the type of applications running over them, resulting in diverse traffic characteristics over time. Constant change in traffic demands complicates the process of allocating appropriate bandwidth via a priority plane in the network switches to assure quality of service ("QoS") in the network. For instance, a given QoS profile, which reserves bandwidth statically for a set of traffic classes, may be appropriate and effective at a given time but may result in adverse behavior if the traffic demands change drastically.

Accordingly, various embodiments of the present invention provide novel solutions to address how to allocate bandwidth among switch queues in cloud networks despite constant changes in traffic demands. In some implementations, one or more quality of service (QoS) policies in one or more cloud network switches may be dynamically changed based on expected traffic demand for each of a plurality of traffic classes. Bandwidth in the one or more cloud network switches may be dynamically allocated based on dynamically changing the QoS policies.

The present invention provides advantages over the current state of the art since many enterprise networks working on QoS policies focus mainly on enterprise networks where the amount of change in the traffic demands of applications is relatively low compared to cloud networks. Moreover, additional advantages over the current state of the art that rely on static bandwidth allocations among network switch queues. This is because static allocations are unsafe in cloud environments where the traffic demands are constantly changing. If traffic allocations for network-sensitive applications are incorrect in QoS policies, the traffic may experience packet delay, jitter, and/or loss while other lower priority traffic avoids such degradation due to incorrect bandwidth allocations.

In other implementations, various differentiated services frameworks may classify traffic types (e.g., traffic class) and configure network elements (switches, routers) to handle marked packets, via the Differentiated Services Code Point ("DSCP") field in the packet header, in a differentiated manner. For example, packets marked as "high priority" may be forwarded before other packets or some bandwidth may be reserved on switch queues in accordance with the importance of traffic.

Such QoS policies may achieve an intended differentiated behavior when the traffic demands of the traffic classes are known or well understood. Thus, the present invention applies to cloud networks where the traffic demands may change drastically over time. In some implementations, QoS policies that are configured on network switches (i.e., queue bandwidth allocations) may be dynamically changed, adjusted, or altered based on per traffic class demand expectations.

In some implementations, the demand expectations can be derived from information pertaining to the scheduling of virtual entities typically accomplished by overlay Software Defined Network (SDN) controllers. In some embodiments, the present invention may map the demands originating from servers to network elements using visibility into the network topology and routing. Furthermore, various embodiments provide for constantly monitoring and identifying network elements that are not in-line with configured policies. Relying on programmability in the cloud network achieved by a software-defined underlay controller to dynamically configure network elements, the present invention may revise switch QoS configurations to reflect the intended traffic handling behavior under a new traffic conditions. In some implementations, the QoS policies may be changed, adjusted, and/or configured based on expected traffic demands in a scalable manner. Only when the expected traffic demand between one or more of the traffic classes exceeds pre-defined thresholds, the allocations may be revised to match the new traffic class demands. As a result, the proposed invention alleviates issues in QoS priority plane enablement when the traffic conditions change constantly.

As used herein, "network elements" may refer to, for example, switches, routers, and other packet processing elements. Also, use of the term "network switch" may be considered as an example or illustration only. Thus, use of the term "network switch" may substituted with "network elements" to address and capture a broader perspective of the present invention.

Additionally, bandwidth allocation between queues may be explicitly defined such as, for example, queue 3 receives 50 gigabytes per second ("Gbps") or implicitly defined such as the scheduler services queue 3 50% of the time; in a 100 Gbps port, this has the net effect of allocation 50 Gbps on queue 3. Also, the bandwidth allocation can be achieved implicitly as well.

Moreover, a key aspect of the present invention is leveraging QoS policies. These policies are applicable to ports on network elements and define how bandwidth is split between the queues of a given port.

Other examples of various aspects of the illustrated embodiments, and attendant benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and Personal Digital Assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 (or memory subsystem 28) can include computer system readable media in the form of volatile memory, such as random access memory (RAM) 30 and/or cache memory 32. Cache memory 32 may comprise, for example, a shared cache (such as an L2 cache) which is shared among multiple cores of the processor 16 and/or may comprise a private cache (such as an L1 cache). Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40 (e.g., P/U), having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 ("P.M.") generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, Redundant Array of Independent Disks (RAID) systems, tape drives, and data archival storage systems, etc.

Figure 2:
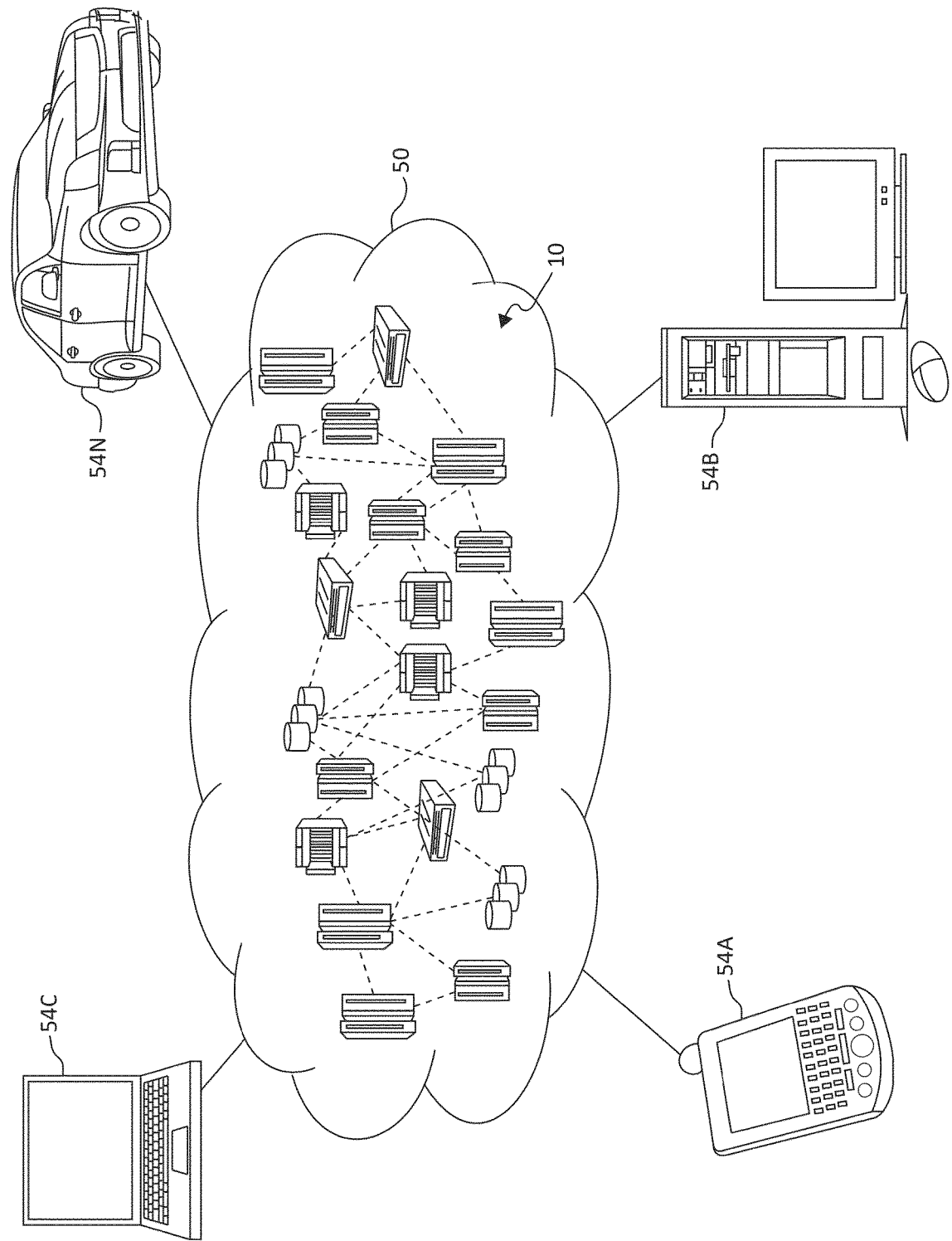
FIG. 2 is an additional block diagram depicting an exemplary cloud computing environment, according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, PDA or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
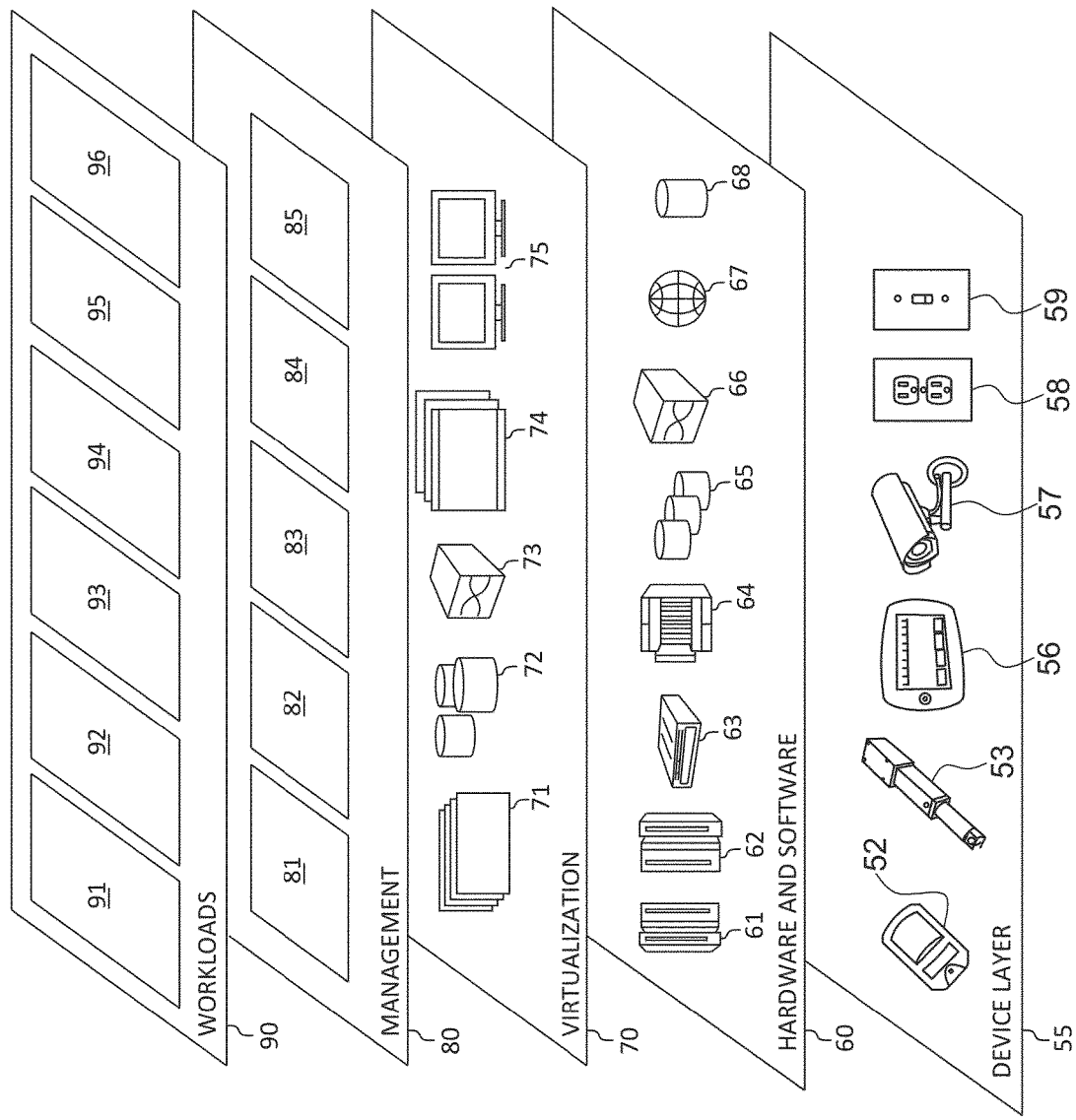
FIG. 3 is an additional block diagram depicting abstraction model layers, according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for dynamic allocating bandwidth among the queues of switch ports in cloud network switches. In addition, workloads and functions 96 for dynamic allocating bandwidth among the queues of switch ports in cloud network switches may include such operations as data analytics, data analysis, and as will be further described, detection and comparison functionality. One of ordinary skill in the art will appreciate that the workloads and functions 96 for dynamic allocating bandwidth among the queues of switch ports in cloud network switches may also work in conjunction with other portions of the various abstractions layers, such as those in hardware and software 60, virtualization 70, management 80, and other workloads 90 (such as, for example, data analytics processing 94, for example) to accomplish the various purposes of the illustrated embodiments of the present invention.

As previously indicated, the present invention provides dynamic bandwidth allocation in cloud network elements in a cloud computing environment. Quality of service (QoS) policies may be dynamically changed in one or more cloud network switches based on dynamically estimating expected traffic demands for each of a plurality of traffic classes, wherein bandwidth is dynamically allocated among queues based on changing the QoS policies.

Figure 4:
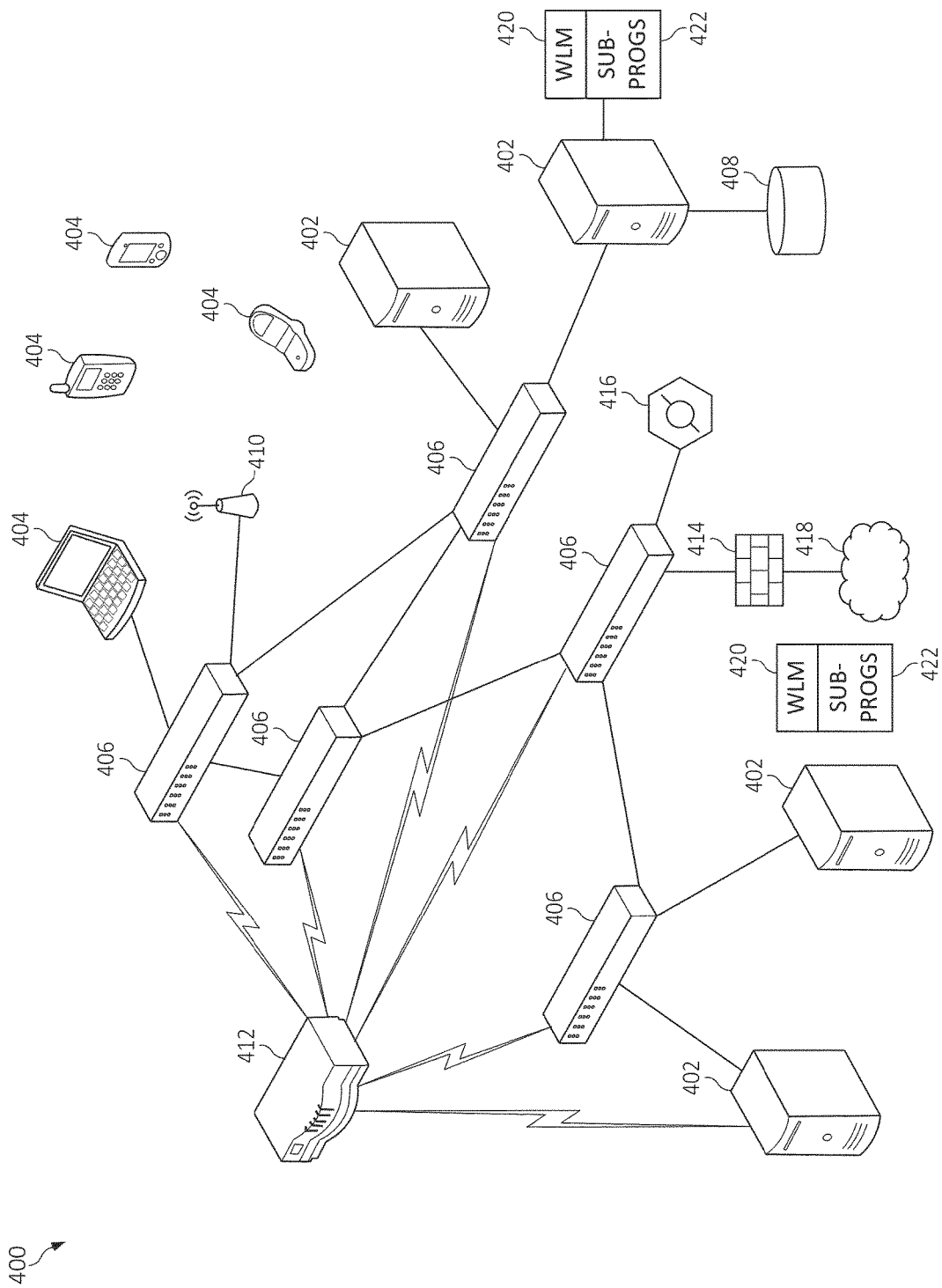
FIG. 4 is an additional block diagram depicting an exemplary functional relationship between various aspects of the present invention.

Turning now to FIG. 4, an example of a system 400 including a network 401 that supports software-defined networking (SDN) will now be described in greater detail. In the example depicted in FIG. 4, the system 400 is an enterprise system including a plurality of servers 402 and client systems 404 configured to communicate over the network 401 using switches 406 that are SDN-capable, e.g., OpenFlow-compatible. Accordingly, the network 401 may also be referred to as enterprise network 401 and can be geographically distributed between multiple physical locations. In exemplary embodiments, the servers 402, also referred as hosts or host systems, are high-speed processing devices (e.g., mainframe computers, desktop computers, laptop computers, hand-held devices, embedded computing devices, or the like) including at least one processing circuit (e.g., a computer processor/CPU) capable of reading and executing instructions, and handling interactions with various components of the system 400. One or more of the servers 402 may be storage system servers configured to access and store large amounts of data to one or more data storage systems 408. The servers 402 may also be compute nodes that include one or more workload managers 420, subprograms 422, and other applications (not depicted).

The client systems 404 can include a variety of desktop, laptop, general-purpose computer devices, mobile computing devices, and/or networked devices with processing circuits and Input/Output (I/O) interfaces, such as keys/buttons, a touch screen, audio input, a display device and audio output. The client systems 404 can be linked directly to one or more of the switches 406 or wirelessly through one or more wireless access points 410.

The data storage systems 408 refer to any type of computer readable storage media and may comprise one or more secondary storage elements, e.g., hard disk drive (HDD), solid-state memory, tape, or a storage subsystem that is internal or external to the servers 402. Types of data that may be stored in the data storage systems 408 include, for example, various files and databases. There may be multiple data storage systems 408 utilized by one or more of the servers 402, which can be distributed in various locations of the system 400.

The system 400 also includes an SDN controller 410 that is a central software-defined network controller configured to make routing decisions within the network 401. The SDN controller 412 establishes secure links 403 to configure the switches 406 and communication properties of links 405 between the switches 406. For example, the SDN controller 412 can configure the switches 406 to control packet routing paths for data flows between the servers 402 and client systems 404, as well as one or more firewalls 414 and one or more load networks 418. The one or more firewalls 414 restrict access and the flow of network traffic between the network 401 and one or more external networks 418. The one or more load networks 418 can distribute workloads across multiple computers, such as between the servers 402. The SDN controller 412 can also configure the switches 406 to define flows between the servers 402, programs (e.g., virtual machines), and subprograms 422 running on the servers 402.

The servers 402, client systems 404, and SDN controller 412 can include various computer/communication hardware and software technology known in the art, such as one or more processing units or circuits, volatile and non-volatile memory including removable media, power supplies, network interfaces, support circuitry, operating systems, and the like. Although the SDN controller 412 is depicted as a separate component, it will be understood that network configuration functionality can alternatively be implemented in one or more of the servers 402 or client systems 404 in a standalone or distributed format.

The network 401 can include a combination of wireless, wired, and/or fiber optic links. The network 401 as depicted in FIG. 4 represents a simplified example for purposes of explanation. For example, each of the links 405 depicted in the network 401 can include more than one physical links. Embodiments of the network 401 can include numerous switches 406 (e.g., hundreds) with dozens of ports and links per switch 406. The switches 406 are also referred to generally as network resources and may represent any type of device that is capable of forwarding data through one or more ports. The network 401 may support a variety of known communication standards that allow data to be transmitted between the servers 402, client systems 404, switches 406, SDN controller 412, firewalls(s) 414, and/or load balancer(s) 416. Communication protocols are typically implemented in one or more layers, such as a physical layer (layer-1), a link layer (layer-2), a network layer (layer-3), a transport layer (layer-4), and an application layer (layer-5). In exemplary embodiments, the network 401 supports SDN as a layer-2 protocol. The switches 406 can be dedicated SDN switches or SDN-enabled general purpose switches that also support layer-2 and layer-3 Ethernet.

In an exemplary embodiment, one of the servers 402 is an enterprise server 402 that is operable to configure the SDN controller 412. A secure link 403 may be used between the enterprise server 402 and the SDN controller 412. The SDN controller 412 can aggregate and allocate flows and manage the interactions. The SDN controller 412 may also list default quality-of-service requirements, such as end-to-end delay and bandwidth requirements, as well as other requirements on a per-link basis, e.g., jitter. The SDN controller 412 can make initial allocations and provisions based on traffic demands and traffic classes.

Figure 5:
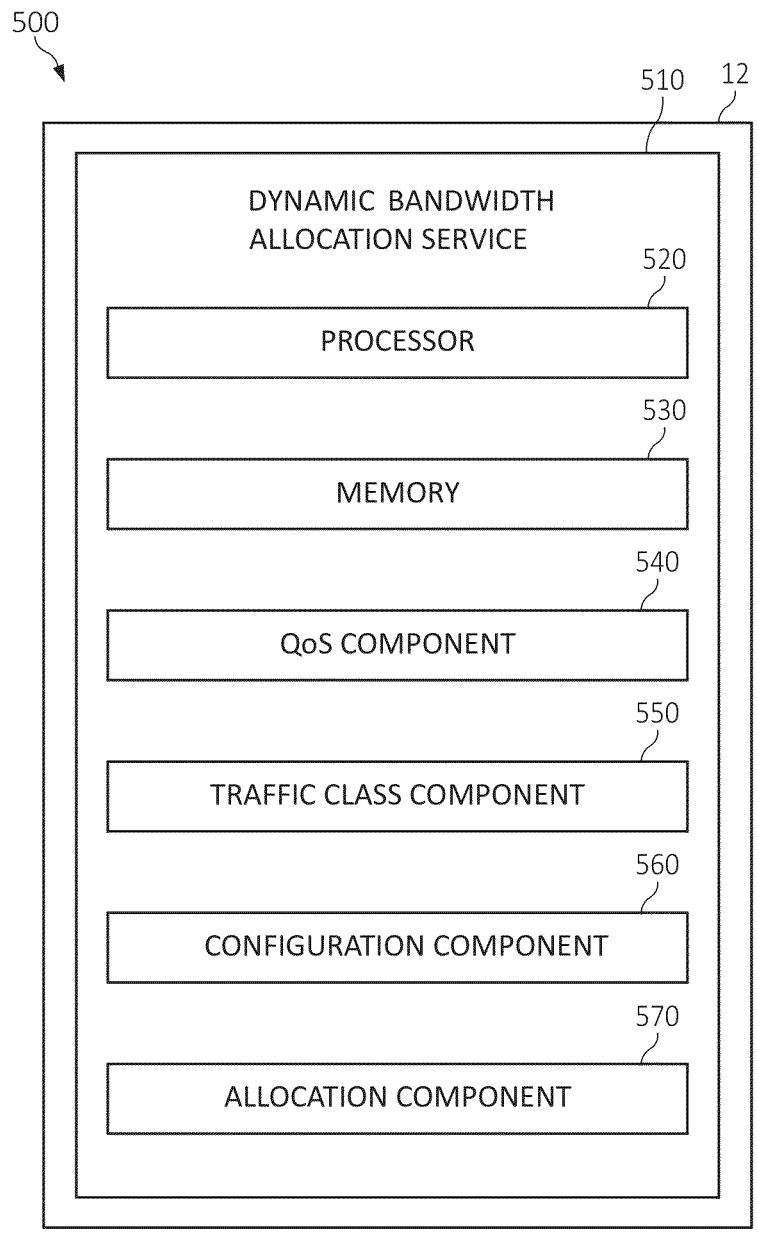
FIG. 5 is a block diagram depicting operations for dynamic bandwidth allocation in cloud network switches in a cloud computing environment based on traffic demand predictions in accordance with an embodiment of the present invention.

Turning now to FIG. 5, a block diagram depicting exemplary functional components 500 according to various mechanisms of the illustrated embodiments is shown. FIG. 5 illustrates a system 500 for dynamic bandwidth allocation in cloud network switches in a cloud computing environment. In one aspect, one or more of the components, modules, services, applications, and/or functions described in FIGS. 1-4 may be used in FIG. 5. In one aspect, repetitive description of like elements, components, modules, services, applications, and/or functions employed in other embodiments described herein (e.g., FIGS. 1-4) is omitted for sake of brevity.

With the foregoing in mind, the module/component blocks 500 may also be incorporated into various hardware and software components of a system for dynamic bandwidth allocation in cloud network switches in a cloud computing environment (e.g., dynamically changing Quality of Service "QoS" policies) in accordance with the present invention. Many of the functional blocks 500 may execute as background processes on various components, either in distributed computing components, or on the user device, or elsewhere.

Computer system/server 12 of FIG. 1 is shown incorporating a dynamic bandwidth allocation service 510. The dynamic bandwidth allocation service 510 may incorporate processor 520 and memory 530 to perform various computational, data processing and other functionality in accordance with various aspects of the present invention. The dynamic bandwidth allocation service 510 may be provided by the computer system/server 12 of FIG. 1.

As one of ordinary skill in the art will appreciate, the depiction of the various functional units in the dynamic bandwidth allocation service 510 is for purposes of illustration, as the functional units may be located within the dynamic bandwidth allocation service 510 or elsewhere within and/or between distributed computing components.

In one aspect, the computer system/server 12 and/or the dynamic bandwidth allocation service 510 may provide virtualized computing services (i.e., virtualized computing, virtualized storage, virtualized networking, etc.). More specifically, the dynamic bandwidth allocation service 510 may provide, and/or be included in, a virtualized computing, virtualized storage, virtualized networking and other virtualized services that are executing on a hardware substrate.

In one aspect, the dynamic bandwidth allocation service 510 may provide and/or be associated with a QoS component 540, traffic class component 550, a configuration component 560, and an allocation component 570, each of which may be in communication with each other.

In one aspect, the dynamic bandwidth allocation service 510, using one or more of the QoS component 540, the traffic class component 550, the configuration component 560, and the allocation component 570, may dynamically change quality of service (QoS) policies in one or more cloud network switches based on expected traffic demand for each of a plurality of traffic classes, wherein bandwidth is dynamically allocated among queues on cloud network switches based on dynamically changing the QoS policies.

In one aspect, the dynamic bandwidth allocation service 510, using one or more of the QoS component 540, the traffic class component 550, and the configuration component 560 may determine the traffic demand based on scheduling of one or more virtual entities by a plurality of overlay network controllers.

In one aspect, the dynamic bandwidth allocation service 510, using one or more of the QoS component 540, the traffic class component 550, and the configuration component 560 may map the traffic demands to network elements using knowledge of the topology and routing in a computing network; and monitor and identify network elements that contradict one or more of with the QoS policies based on the mapping.

The QoS component 540, in association with the configuration component 560, may switch or adjust the QoS policies based on the expected traffic demand.

In one aspect, the dynamic bandwidth allocation service 510, using one or more of the QoS component 540, the traffic class component 550, and the configuration component 560 may determine a maximum amount of the traffic demand for each of the plurality of traffic classes by determining a number of one or more virtual entities executing on one or more computing servers.

In some implementations, the configuration component 560 may configure a plurality of network elements based on dynamically changing the QoS policies.

In other implementations, in relation to dynamically changing the QoS policies in one or more cloud network switches based on expected traffic demand, the dynamic bandwidth allocation service 510, using one or more of the QoS component 540, the traffic class component 550, and the configuration component 560 may determine the traffic demand for each of the plurality of traffic classes exceeds a predefined traffic threshold; and dynamically allocate bandwidth among queues on cloud network switches to enable processing and servicing the traffic demand based upon the QoS policies.

Figure 6:
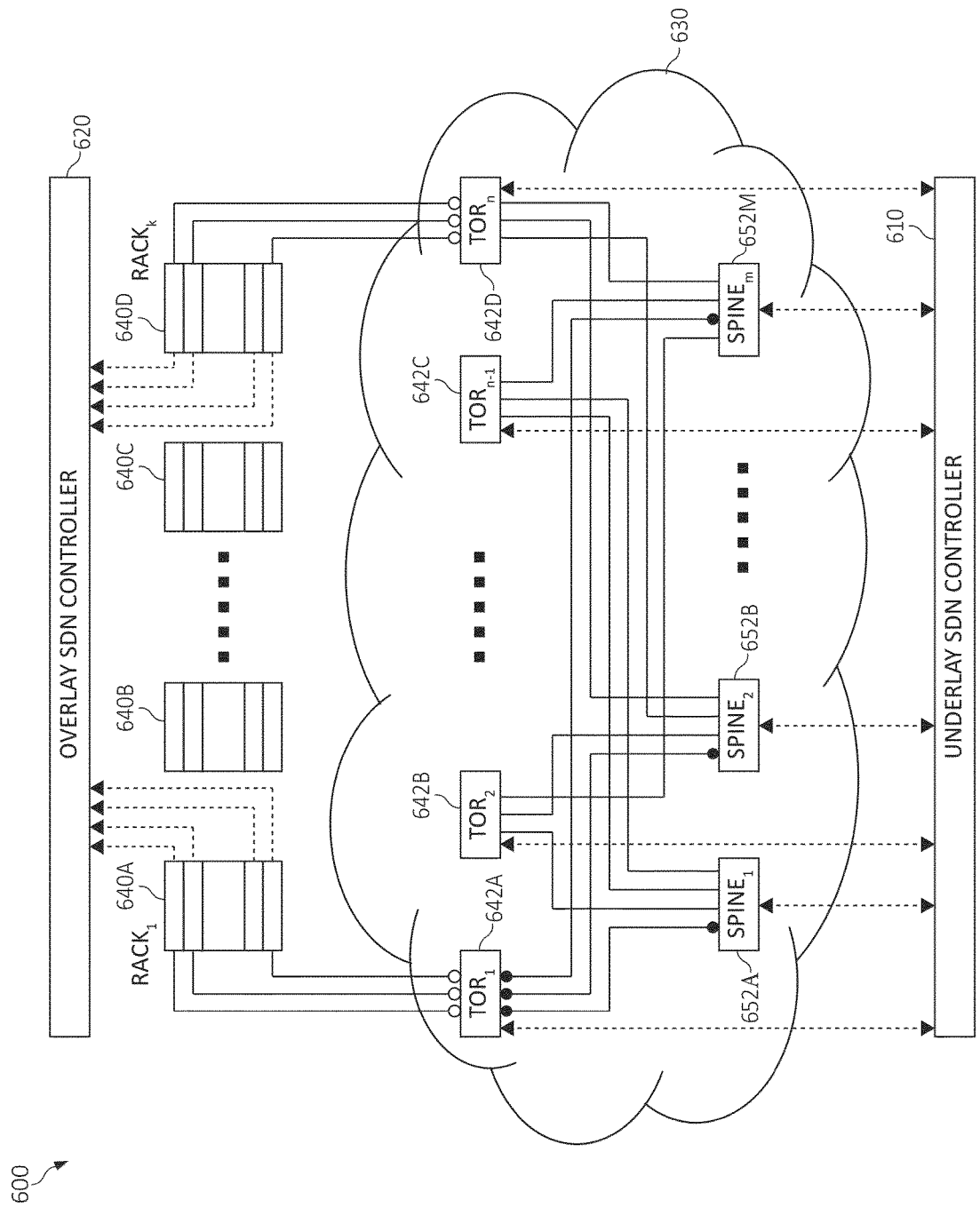
FIG. 6 is a block diagram depicting operations for dynamic bandwidth allocation in cloud network switches in a cloud computing environment based on traffic demand predictions in accordance with an embodiment of the present invention.

For further explanation, FIG. 6 is a block diagram depicting operations for dynamic bandwidth allocation in cloud network switches in a cloud computing environment based on traffic demand predictions in accordance with an embodiment of the present invention.

That is, FIG. 6 is a block diagram depicting a spine/leaf network 600 with equal cost multi path ("ECMP") protocol running between spine and leaf switches such as, for example, spine switches 652A-M and leaf switches 642A-D. In one aspect, one or more of the components, modules, services, applications, and/or functions described in FIGS. 1-5 may be used in FIG. 6. In one aspect, repetitive description of like elements, components, modules, services, applications, and/or functions employed in other embodiments described herein (e.g., FIGS. 1-5) is omitted for sake of brevity. In some implementations, it may be assumed a data center network with a spine/leaf network 600 topology such as, for example, the spine switches 652A-M in network 630, but may apply to other network topologies as well.

As depicted in FIG. 6, the composition of 3 servers is included in rack 1 (i.e., rack 640A) as well as the overall composition of rack 1 changed beyond the pre-established threshold. As a result, one or more QoS policies on all ports associated with are revised (e.g., all ports shown in black dots such as, for example, ports of leaf switches 642A and spine switches 652A-M and ports shown in the clear dots such as, for example, ports of leaf switches 642A and 642D). The QoS policies in some of the ports (e.g., clear dots such as, for example, ports of leaf switches 642A and 642D) are based on server traffic compositions. Similarly, the QoS policies in some of the ports (e.g., all ports shown in black dots such as, for example, ports of leaf switches 642A and spine switches 652A-M) reflect the change in the aggregate rack traffic.

Thus, the present invention such as, for example, using the spine/leaf network 600 provides for dynamically changing QoS policies in cloud network switches in a cloud computing network 630 based on demand expectations per traffic class (TC). As depicted in FIG. 6, an underlay cloud network controller 610 (e.g., an underlay SDN controller) and an overlay cloud network controller 620 (e.g., an overlay SDN controller) and the communication between them. The underlay cloud network controller 610 and the overlay cloud network controller 620 could be co-located and/or incorporated into a single network stack. The underlay cloud network controller 610 has visibility into the cloud computing network 630 topology and routes between servers in the network 630 and has the ability to update traffic handling behavior on network switches.

The overlay cloud network controller 620 may include all of the necessary information to generate expected traffic demands for each traffic class ("TC") on each server such as, for example, server in each of the server racks 640A-640D. These expected demands may be calculated based on virtual machine ("VM") profiles that may be executing/running on the server racks 640A-640D.

For example, the network 630 speeds up each of the VMs of a given type hosted on a server (e.g., one of the servers on the racks 640A-640D) that may be used as the expected tenant traffic demand for that given VM type. Additionally, if one of the traffic classes is for storage, then the maximum amount of traffic allocated to a server (e.g., one of the servers on the racks 640A-640D) can be computed by summing up the storage demands of all VMs running on the server (e.g., one of the server racks 640A-640D) utilizing upper bounds of virtual disc Input/Output operations per second ("IOPS"). This information can be aggregated to the rack level by summing up the expected demands for a given class across all servers in the rack such as, for example, each of the servers on one or more of the racks 640A-640D.

The overlay cloud network controller 620 periodically informs the underlay cloud network controller 610 about changes in the expected demands per TC due to the arrival and/or departure of virtual entities such as VMs, virtual NICs, and virtual discs. For example, if k traffic classes are supported, then the underlay cloud network controller 610 keeps the amount of expected demand for each of the k classes based on the network 630 resources allocated to virtual entities running on each of the servers (e.g., one or more of the servers on one or more of the racks 640A-640D).

The underlay cloud network controller 610 keeps track of the composition of demands at the server level and the rack level (e.g., one or more of the servers on one or more of the racks 640A-640D) for each traffic class and may map multiple traffic classes map to an output queue at a switch port.

This mapping of traffic classes to output queues is configurable. The underlay cloud network controller 610 also maintains QoS profiles for each port in the network 630. QoS profile of a port reflects how much of a switch's resources should be assigned to processing traffic for each output queue. Hence, a QoS policy determines how traffic from each class is handled by a switch.

In some implementations, the QoS policy at a switch port may use round robin scheduling to assign scheduler's time to each output queue. The QoS policies may be defined using caps or reservations of traffic reflecting user's preferences based on expected demands for each output queue. For example, assuming a port speed of 100 gigabyte per second (Gbps) for illustrative purposes, if the underlay cloud network controller 610 knows that the demands mapping to i traffic calls will never exceed pi Gbps, then the resource allocation for queue the i traffic calls may be configured at pi %, where i is a positive integer.

For example, a QoS policy may assign the following percentages [p1, p2, p3, p4, p5, p6, p7, p8] where p1+ . . . +p8 equal 100%. If the expected amount of traffic mapping to queue changes, the QoS profile may be revised to reflect the change. This mapping of traffic classes to output queues and then to resource allocations may be managed by the underlay cloud network controller 610. Initially, all of the queues in all underlay switches may be allocated to share the available resources evenly between TCs.

As the composition of traffic demands change in the cloud network resulting in changes in expected demands, the proposed invention changes QoS policies at ports accordingly. The underlay cloud network controller 610 identifies servers (e.g., one or more of the servers on one or more of the racks 640A-640D) whose traffic composition has changed beyond an established threshold compared to the last update from the overlay cloud network controller 620.

The goal is to avoid updates for minor changes and make modifications when there is a substantial difference in traffic composition. Assuming k traffic classes, this computation involves comparing two vectors. For example, this identification may be based on heuristics such as flagging ports whose demand for any traffic class increased two-fold or reduced by half. The sensitivity of this computation may be tuned based on the needs of the network 630. When the overlay cloud network controller 620 notifies the underlay cloud network controller 610, the underlay cloud network controller 610 performs the following. In step 1a, a set of servers, S, may be identified whose traffic composition has changed beyond an established threshold compared to the last update. In step 1b) for each port on the leaf switch such, as for example, on one of the leaf switches 642A-D connected to a server in S, the egress QoS policy may be changed to reflect the new composition. In step 2a) a set of racks R (e.g., one of the server racks 640A-640D) may be identified, whose traffic composition has changed beyond the established threshold compared to last update. In step 2b) for each leaf 1, connected to a rack in R, the QoS policy may be changed on ports facing spine switches to reflect the new QoS policy on each spine (e.g., each of the spine switches 652A-M), the QoS policy may be changed on the port to 1 to reflect the new QoS policy.

As depicted in FIG. 6, shows an example spine/leaf network with equal cost multi path (ECMP) protocol running between spine and leaf switches. In this example, the composition of 3 servers in rack 1 as well as the overall composition of rack 1 changed beyond the pre-established threshold. As a result, the QoS policies on all the ports shown (e.g., one of the server racks 640A-640D, 642A, and each of the spine switches 652A-M) are revised. The QoS policies in the orange ports are based on the server traffic compositions per step 1a. Similarly, the QoS policies in the red ports reflect the change in the aggregate rack traffic per step 2b.

The QoS policy changes may be applied in discrete steps that are defined in advance and triggered only if certain thresholds are exceeded. The logic to adjust a threshold or trigger a QoS policy change in switch ports may consider real-time information, i.e., when packet losses for certain traffic classes occur or based on sampling traffic flows in the fabric in real time. QoS policies for traffic classes that routinely exceed their allocations may be adjusted.

Figure 7:
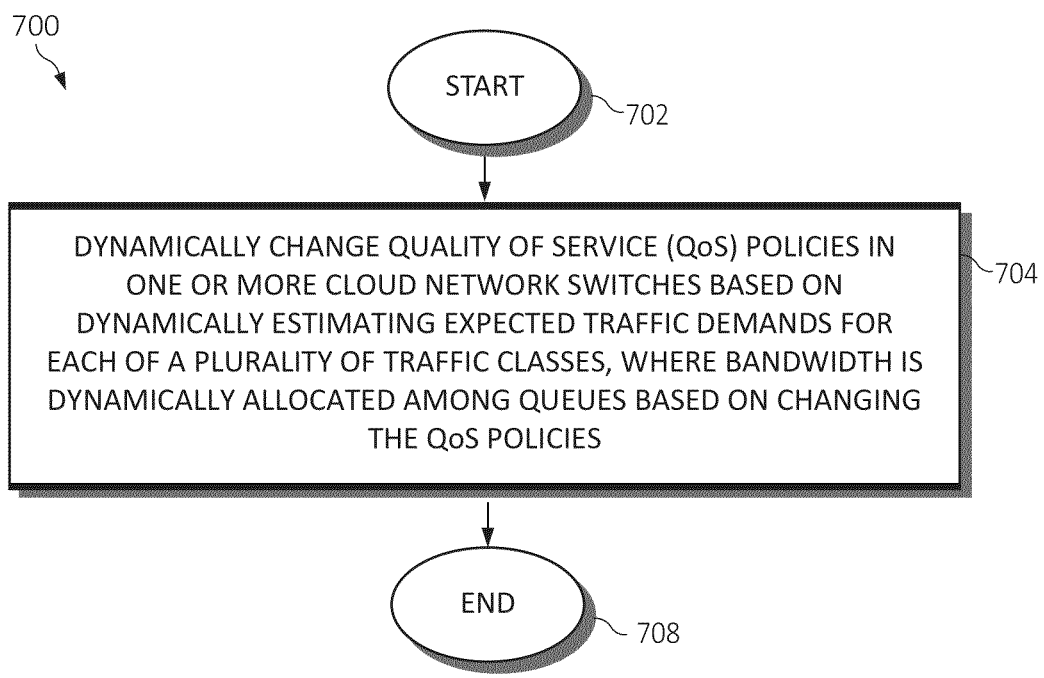
FIG. 7 is an additional flowchart diagram depicting a method for dynamic bandwidth allocation in cloud network switches in a cloud computing environment based on traffic demand predictions in accordance with an embodiment of the present invention.

Turning now to FIG. 7, a method 700 for dynamic bandwidth allocation in cloud network switches in a cloud computing environment by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

Quality of service (QoS) policies may be dynamically changed in one or more cloud network switches based on dynamically estimating expected traffic demands for each of a plurality of traffic classes, where bandwidth is dynamically allocated among queues based on changing the QoS policies, as in block 704. Bandwidth in the one or more cloud network switches may be dynamically allocated based on dynamically changing the QoS policies, as in block 706. The functionality 700 may end, as in block 708.

In one aspect, in conjunction with and/or as part of at least one block of FIG. 7, the operations of method 700 may include each of the following. The operations of method 700 may determine the traffic demands based on communication with an overlay controller that schedules one or more virtual entities. The operations of method 700 may map the traffic demands from one or more compute servers to network elements using topology and routing in a computing network; and monitor and identify network elements that contradict one or more of with the QoS policies based on the mapping.

The operations of method 700 may switch or adjust the QoS policies based on the expected traffic demand. The operations of method 700 may determine a maximum amount of the traffic demand for each of the plurality of traffic classes by determining a number of one or more virtual entities executing on one or more computing servers and using profiles of the one or more virtual entities. The operations of method 700 may configure a plurality of network elements based on dynamically changing the QoS policies.

The operations of method 700 may, in association with dynamically changing the QoS policies in one or more cloud network switches based on expected traffic demand, determine the traffic demand for each of the plurality of traffic classes exceeds a predefined traffic threshold; and dynamically allocate network resources such as, for example, bandwidth to the one or more cloud network elements to enable processing and servicing the traffic demand based upon the QoS policies The operations of method 700 may switch or adjust the QoS policies based on the expected traffic demand. The operations of method 700 may determine a maximum amount of the traffic demand for each of the plurality of traffic classes by determining a number of one or more virtual entities executing on one or more computing servers. The operations of method 700 may configure a plurality of network elements based on dynamically changing the QoS policies. The operations of method 700 may determine the traffic demand for each of the plurality of traffic classes exceeds a predefined traffic threshold; and dynamically allocate bandwidth among queues on cloud network switches to enable processing and servicing the traffic demand based upon the QoS policies.

The operations of method 700 may determine one or more virtual entities are scheduled or removed for executing on the one or more cloud network switches; and reserve or release one or more network elements and resources for the traffic demand of each of the plurality of traffic classes based on determining one or more virtual entities are scheduled or removed.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for dynamic bandwidth allocation in cloud network elements in a cloud computing environment, by a processor, comprising:
    monitoring, by an overlay controller of one or more cloud network switches, expected traffic demands of each of a plurality of traffic classes based on an arrival or departure of one or more virtual entities scheduled to execute on one or more compute servers by the overlay controller;
    monitoring, by an underlay controller of the one or more cloud network switches, a composition of traffic demands for each of the plurality of traffic classes at both a server-level and a rack-level of the one or more compute servers of the cloud computing environment; and
    dynamically changing quality of service (QoS) policies in the one or more cloud network switches based on dynamically estimating the expected traffic demands for each of the plurality of traffic classes through periodic communication between the overlay controller and the underlay controller, wherein the underlay controller maintains a mapping of those of the plurality of traffic classes each associated with particular queues, and wherein bandwidth is dynamically allocated among the particular queues at a specific output port of the one or more cloud network switches based on changing the QoS policies by:
        at each update iteration, changing the QoS policies associated with ports of a leaf switch of the one or more cloud network switches based on each of the monitoring, and
        subsequent to changing the QoS policies associated with the ports of the leaf switch, at each update iteration, changing the QoS policies associated with ports associated with a spine switch of the one or more cloud network switches based on each of the monitoring.

2. The method of claim 1, further including:
    mapping the traffic demands from the one or more compute servers to network elements using topology and routing in a computing network; and
    monitoring and identifying network elements that contradict one or more of with the QoS policies based on the mapping.

3. The method of claim 1, further including switching or adjusting the QoS policies based on the expected traffic demands.

4. The method of claim 1, further including determining a maximum amount of the traffic demand for each of the plurality of traffic classes by determining a number of the one or more virtual entities executing on the one or more compute servers and using profiles of the one or more virtual entities.

5. The method of claim 1, further including configuring a plurality of network elements based on dynamically changing the QoS policies.

6. The method of claim 1, wherein dynamically changing the QoS policies in the one or more cloud network switches based on expected traffic demand further includes:
    determining the traffic demand for each of the plurality of traffic classes exceeds a predefined traffic threshold; and
    dynamically allocating network resources to the one or more cloud network elements to enable processing and servicing the traffic demand based upon the QoS policies.

7. A system for dynamic bandwidth allocation in cloud network elements in a cloud computing environment, the system comprising:
    one or more computers with executable instructions that when executed cause the system to:
        monitor, by an overlay controller of one or more cloud network switches, expected traffic demands of each of a plurality of traffic classes based on an arrival or departure of one or more virtual entities scheduled to execute on one or more compute servers by the overlay controller;
        monitor, by an underlay controller of the one or more cloud network switches, a composition of traffic demands for each of the plurality of traffic classes at both a server-level and a rack-level of the one or more compute servers of the cloud computing environment; and
        dynamically change quality of service (QoS) policies in the one or more cloud network switches based on dynamically estimating the expected traffic demands for each of the plurality of traffic classes through periodic communication between the overlay controller and the underlay controller, wherein the underlay controller maintains a mapping of those of the plurality of traffic classes each associated with particular queues, and wherein bandwidth is dynamically allocated among the particular queues at a specific output port of the one or more cloud network switches based on changing the QoS policies by:
            at each update iteration, changing the QoS policies associated with ports of a leaf switch of the one or more cloud network switches based on each of the monitoring, and
            subsequent to changing the QoS policies associated with the ports of the leaf switch, at each update iteration, changing the QoS policies associated with ports associated with a spine switch of the one or more cloud network switches based on each of the monitoring.

8. The system of claim 7, wherein the executable instructions when executed cause the system to:
    map the traffic demands from the one or more compute servers to network elements using topology and routing in a computing network; and
    monitor and identify network elements that contradict one or more of with the QoS policies based on the mapping.

9. The system of claim 7, wherein the executable instructions when executed cause the system to switch or adjust the QoS policies based on the expected traffic demand.

10. The system of claim 7, wherein the executable instructions when executed cause the system to determine a maximum amount of the traffic demand for each of the plurality of traffic classes by determining a number of the one or more virtual entities executing on the one or more compute servers and using profiles of the one or more virtual entities.

11. The system of claim 7, wherein the executable instructions when executed cause the system to configure a plurality of network elements based on dynamically changing the QoS policies.

12. The system of claim 7, wherein dynamically changing the QoS policies in the one or more cloud network switches based on expected traffic demand further includes:
    determining the traffic demand for each of the plurality of traffic classes exceeds a predefined traffic threshold; and
    dynamically allocating network resources to the one or more cloud network elements to enable processing and servicing the traffic demand based upon the QoS policies.

13. A computer program product for dynamic bandwidth allocation in cloud network elements in a cloud computing environment, the computer program product comprising:
    one or more computer readable storage media, and program instructions collectively stored on the one or more computer readable storage media, the program instruction comprising:
    program instructions to monitor, by an overlay controller of one or more cloud network switches, expected traffic demands of each of a plurality of traffic classes based on an arrival or departure of one or more virtual entities scheduled to execute on one or more compute servers by the overlay controller;
    program instructions to monitor, by an underlay controller of the one or more cloud network switches, a composition of traffic demands for each of the plurality of traffic classes at both a server-level and a rack-level of the one or more compute servers of the cloud computing environment; and
    program instructions to dynamically change quality of service (QoS) policies in the one or more cloud network switches based on dynamically estimating the expected traffic demands for each of the plurality of traffic classes through periodic communication between the overlay controller and the underlay controller, wherein the underlay controller maintains a mapping of those of the plurality of traffic classes each associated with particular queues, and wherein bandwidth is dynamically allocated among the particular queues at a specific output port of the one or more cloud network switches based on changing the QoS policies by:
    at each update iteration, changing the QoS policies associated with ports of a leaf switch of the one or more cloud network switches based on each of the monitoring, and
    subsequent to changing the QoS policies associated with the ports of the leaf switch, at each update iteration, changing the QoS policies associated with ports associated with a spine switch of the one or more cloud network switches based on each of the monitoring.

14. The computer program product of claim 13, further including program instructions to switch or adjust the QoS policies based on the expected traffic demand.

15. The computer program product of claim 13, further including program instructions to:
    map the traffic demands from the one or more compute servers to network elements using topology and routing in a computing network; and
    monitor and identify network elements that contradict one or more of with the QoS policies based on the mapping.

16. The computer program product of claim 13, further including program instructions to determine a maximum amount of the traffic demand for each of the plurality of traffic classes by determining a number of the one or more virtual entities executing on the one or more compute servers and using profiles of the one or more virtual entities.

17. The computer program product of claim 13, further including program instructions to configure a plurality of network elements based on dynamically changing the QoS policies.

18. The computer program product of claim 13, wherein dynamically changing the QoS policies in the one or more cloud network switches based on expected traffic demand further includes:
    determining the traffic demand for each of the plurality of traffic classes exceeds a predefined traffic threshold; and
    dynamically allocating network resources to the one or more cloud network elements to enable processing and servicing the traffic demand based upon the QoS policies.

* * * * *